(12) United States Patent
Cordaro et al.

(10) Patent No.: US 12,376,726 B2
(45) Date of Patent: Aug. 5, 2025

(54) SYSTEMS FOR PREVENTING ROTATION OF FILL FUNNEL IN DISHWASHING APPLIANCES

(71) Applicant: Haier US Appliance Solutions, Inc., Wilmington, DE (US)

(72) Inventors: Rocco Cordaro, Louisville, KY (US); Aldo Vincent Kremmel, Palmyra, IN (US); Zachary Wiles, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 305 days.

(21) Appl. No.: 18/169,664

(22) Filed: Feb. 15, 2023

(65) Prior Publication Data

US 2024/0268626 A1 Aug. 15, 2024

(51) Int. Cl.
*A47L 15/42* (2006.01)
*F16B 39/282* (2006.01)

(52) U.S. Cl.
CPC ....... *A47L 15/4217* (2013.01); *A47L 15/4246* (2013.01); *F16B 39/282* (2013.01)

(58) Field of Classification Search
None
See application file for complete search history.

(56) References Cited

U.S. PATENT DOCUMENTS

| 3,394,725 | A |   | 7/1968 | Lawrence |
| 3,717,168 | A |   | 2/1973 | Yake |
| 3,821,961 | A |   | 7/1974 | Schimke |
| 3,915,180 | A | * | 10/1975 | Jacobs ................. A47L 15/485 |
|           |   |   |         | 134/108 |
| 4,449,737 | A |   | 5/1984 | Specht |
| 5,251,939 | A |   | 10/1993 | Jordan |
| 6,349,731 | B1 |  | 2/2002 | Schaaf et al. |
| 9,445,705 | B2 |  | 9/2016 | Joshi |

\* cited by examiner

*Primary Examiner* — Levon J Shahinian
(74) *Attorney, Agent, or Firm* — Dority & Manning, P.A.

(57) ABSTRACT

A dishwashing appliance includes a fill funnel positioned at a fill hole in the side of a tub. The fill funnel includes a mating face positioned at an exterior of the tub with at least two fins extending from the mating face, and a fill funnel outlet extending through the fill hole at the side of the tub. The at least two fins engage a mastic layer at the exterior of the tub. A locking nut is removably coupled to the fill funnel at the wash chamber of the tub. The locking nut includes a plurality of cored-out portions configured to receive a plurality of extrusions of the fill funnel outlet passing through the locking nut. The dishwashing appliance further includes a gasket positioned between the fill funnel and the locking nut.

19 Claims, 10 Drawing Sheets

SYSTEMS FOR PREVENTING ROTATION OF FILL FUNNEL IN DISHWASHING APPLIANCES

FIELD OF THE INVENTION

The present subject matter relates generally to fill funnels in dishwashing appliances and, more specifically, to systems for preventing rotation of the fill funnels.

BACKGROUND OF THE INVENTION

Dishwashing appliances generally include a tub that defines a wash chamber. Rack assemblies can be mounted within the wash chamber of the tub for receipt of articles for washing. Multiple spray assemblies can be positioned within the wash chamber for applying or directing wash fluid (e.g., water, detergent, etc.) towards articles disposed within the rack assemblies in order to clean such articles. Dishwashing appliances are also typically equipped with one or more pumps, such as a circulation pump or a drain pump, for directing or motivating wash fluid from the wash chamber (e.g., to the spray assemblies or an area outside of the dishwashing appliance).

Generally, a fill funnel is mounted in the dishwashing appliance in order to supply water for the wash cycles. Unsecure fill funnels in dishwashing appliances can cause water leaks and spillage from the fill funnel. A fill funnel that properly secures in the dishwashing appliance would be advantageous.

BRIEF DESCRIPTION OF THE INVENTION

Aspects and advantages of the invention will be set forth in part in the following description, or may be apparent from the description, or may be learned through practice of the invention.

In one example embodiment, a dishwashing appliance includes a tub defining a wash chamber for receipt of articles for washing. The tub includes a fill hole in a side of the tub and a door mounted to the tub to selectively restrict access to the wash chamber of the tub. The dishwasher appliance also includes a mastic layer mounted on the tub around at least a portion of an exterior of the tub, and a fill funnel positioned at the fill hole in the side of the tub. The fill funnel includes a mating face positioned at the exterior of the tub with at least two fins extending from the mating face, and a fill funnel outlet extending through the fill hole at the side of the tub. The at least two fins engage with the mastic layer at the exterior of the tub. A locking nut is removably coupled to the fill funnel at the wash chamber of the tub. The locking nut includes a plurality of cored-out portions configured to receive a plurality of extrusions of the fill funnel outlet passing through the locking nut. The dishwashing appliance further includes a gasket positioned between the fill funnel and the locking nut.

In another example embodiment, a dishwashing appliance includes a tub defining a wash chamber for receipt of articles for washing. The tub includes a fill hole in a side of the tub and a door mounted to the tub to selectively restrict access to the wash chamber of the tub. The dishwasher appliance also includes a mastic layer mounted on the tub around at least a portion of an exterior of the tub, and a fill funnel positioned at the fill hole in the side of the tub. The fill funnel includes a mating face positioned at the exterior of the tub with at least two fins extending from the mating face, and a fill funnel outlet extending through the fill hole at the side of the tub. The at least two fins engage with the mastic layer at the exterior of the tub. A locking nut is removably coupled to the fill funnel at the wash chamber of the tub. The locking nut includes a cored-out portion configured to receive a extrusion of the fill funnel outlet passing through the locking nut. The dishwashing appliance further includes a gasket positioned between the fill funnel and the locking nut.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Repeat use of reference characters in the present specification and drawings is intended to represent the same or analogous features or elements of the present invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "includes" and "including" are intended to be inclusive in a manner similar to the term "comprising." Similarly, the term "or" is generally intended to be inclusive (i.e., "A or B" is intended to mean "A or B or both"). Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. For example, the approximating language may refer to being within a 10 percent margin.

As used herein, the term "article" may refer to, but need not be limited to dishes, pots, pans, silverware, and other cooking utensils and items that can be cleaned in a dishwashing appliance. The term "wash cycle" is intended to refer to one or more periods of time during which a dishwashing appliance operates while containing the articles to be washed and uses a detergent and water, preferably with agitation, to e.g., remove soil particles including food and other undesirable elements from the articles. The term "rinse cycle" is intended to refer to one or more periods of time during which the dishwashing appliance operates to remove residual soil, detergents, and other undesirable elements that were retained by the articles after completion of the wash cycle. The term "drain cycle" is intended to refer to one or more periods of time during which the dishwashing appliance operates to discharge soiled water from the dishwashing appliance. The term "cleaning cycle" is intended to refer to one or more periods of time that may include a wash cycle, rinse cycle, and/or a drain cycle. The term "wash fluid" refers to a liquid used for washing and/or rinsing the articles and is typically made up of water that may include other additives such as detergent or other treatments.

Figure 1:
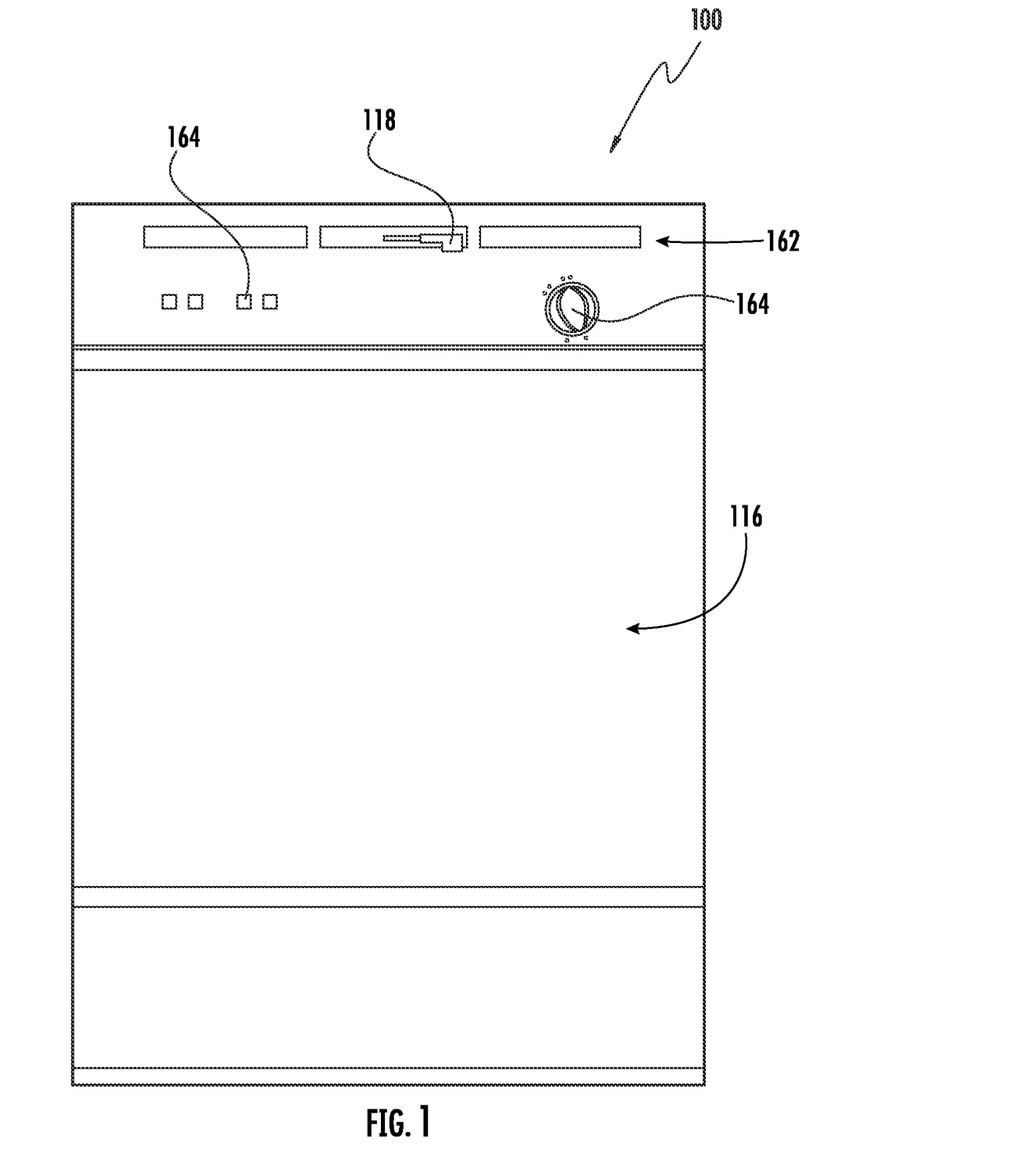
FIG. 1 provides a perspective view of an example embodiment of a dishwashing appliance of the present disclosure.
Figure 2:
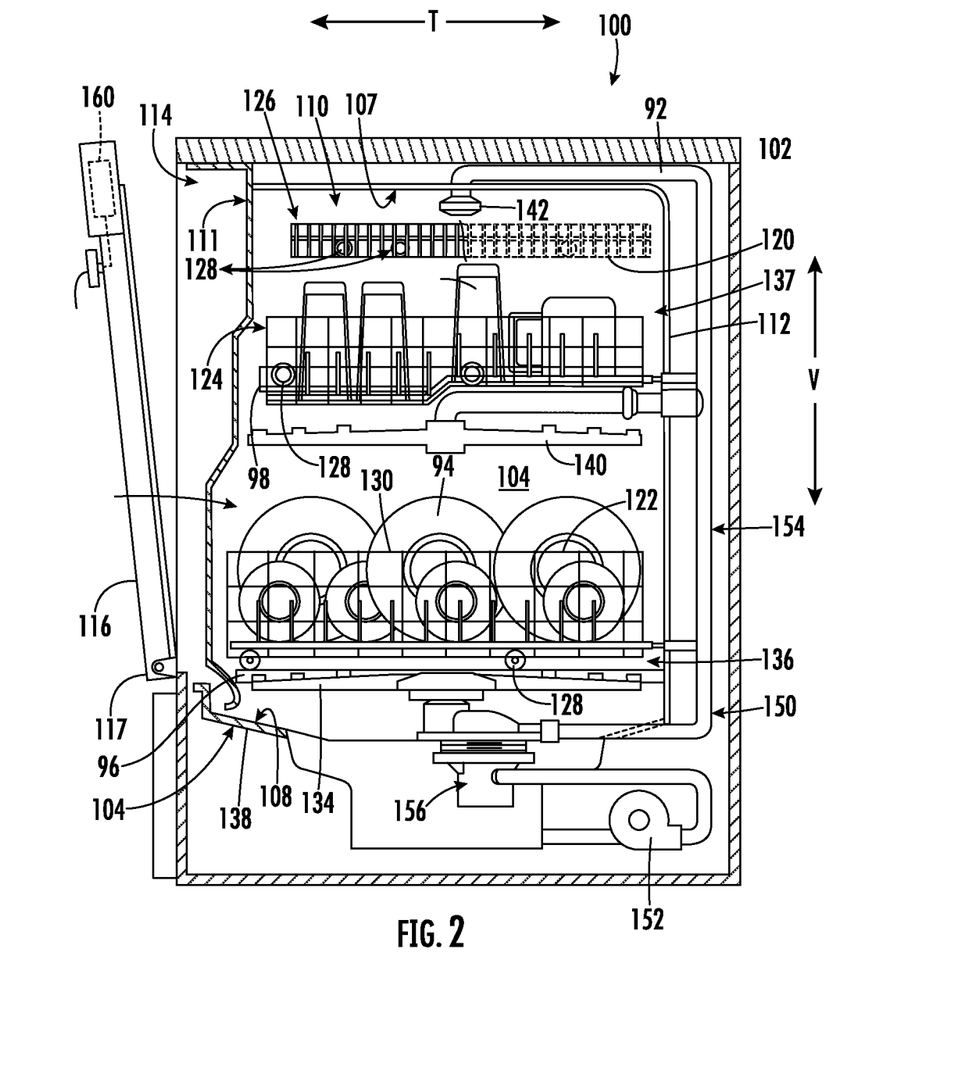
FIG. 2 provides a side, cross sectional view of the example dishwashing appliance of FIG. 1.

FIGS. 1 and 2 depict an example domestic dishwasher or dishwashing appliance 100 that may be configured in accordance with aspects of the present disclosure. For the particular embodiment of FIGS. 1 and 2, the dishwasher appliance 100 includes a cabinet 102 (FIG. 2) having a tub 104 therein that defines a wash chamber 106 for receipt of articles 94 for washing. As shown in FIG. 2, tub 104 extends between a top 107 and a bottom 108 along a vertical direction V, between a pair of opposing side walls 110 along a lateral direction L, and between a front side 111 and a rear side 112 along a transverse direction T. Each of the vertical direction V, lateral direction L, and transverse direction T are mutually perpendicular to one another.

In this regard, as used herein, the terms "cabinet," "housing," and the like are generally intended to refer to an outer frame or support structure for appliance 100, e.g., including any suitable number, type, and configuration of support structures formed from any suitable materials, such as a system of elongated support members, a plurality of interconnected panels, or some combination thereof. It should be appreciated that cabinet 102 does not necessarily require an enclosure and may simply include open structure supporting various elements of appliance 100. By contrast, cabinet 102 may enclose some or all portions of an interior of cabinet 102. It should be appreciated that cabinet 102 may have any suitable size, shape, and configuration while remaining within the scope of the present subject matter.

The tub 104 includes a front opening 114 and a door 116 hinged at its bottom 117 for movement between a normally closed vertical position (shown in FIG. 1), wherein the wash chamber 106 is sealed shut for washing operation, and a horizontal open position for loading and unloading of articles from the dishwasher appliance 100. According to example embodiments, dishwasher appliance 100 further includes a door closure mechanism or assembly 118 that is used to lock and unlock door 116 for accessing and sealing wash chamber 106.

At least one rack assembly is slidably positioned within wash chamber 106 and is configured for the receipt of articles for cleaning. For the example embodiment shown in FIG. 2, opposing tub sidewalls 110 accommodate a plurality of rack assemblies. More specifically, guide rails 96, 98 and 120 may be mounted to (or formed as part of) sidewalls 110 for supporting a first rack assembly 122 (also referred to as a lower rack assembly 122), a middle rack assembly 124 (also referred to as a second rack assembly 124), and a third rack assembly 126 (also referred to as an upper rack assembly 126). As illustrated, upper rack assembly 126 is positioned at a top portion of wash chamber 106 above middle rack assembly 124, which is positioned above lower rack assembly 122 along the vertical direction V. Additional details regarding the upper rack assembly 126 will be provided herein. For this example embodiment, upper rack assembly 126 is supported on opposing sidewalls 110 by rails 120 but rails 120 could be supported on and attached to middle rack assembly 124 as well.

Each rack assembly 122, 124, 126 is adapted for movement along transverse direction T between an extended loading position (not shown) in which the rack is substantially positioned outside the wash chamber 106, and a retracted position (shown in FIGS. 1 and 2) in which the rack is located inside the wash chamber 106. This may be facilitated, for example, by rollers, or guide wheels 128 mounted onto rack assemblies 122, 124, 126, respectively. Although guide rails 96, 98, 120 and guide wheels 128 are illustrated herein as facilitating movement of the respective rack assemblies 122, 124, 126, it should be appreciated that any suitable sliding mechanism or member may be used according to alternative embodiments. In some embodiments, dishwasher appliance 100 may accommodate a different number of rack assemblies and supporting guide rails. For example, dishwasher appliance 100 may accommodate only first rack assembly 122 and upper rack assembly 126, with accompanying guide rails.

Some or all of the rack assemblies 122, 124, 126 may be fabricated into lattice, or grid, structures including a plurality of wires or elongated members 130 (for clarity of illustration, not all elongated members making up rack assemblies 122, 124, 126 are shown in FIG. 2). The plurality of wires or elongated members 130 may be either steel and stainless steel, and the wire may be coated with none, one, or more of nylon and polyvinyl chloride. Rack assemblies 122, 124, 126 are generally configured for supporting articles 94 within wash chamber 106 while allowing a flow of wash fluid to reach and impinge on those articles, e.g., during a cleaning or rinsing cycle. For some embodiments, a silverware basket (not shown) is removably attached to a rack assembly, e.g., lower rack assembly 122, for placement of silverware, utensils, and the like, that are otherwise too small or delicate to be accommodated by rack 122.

At least one spray assembly is located in wash chamber 106 and is configured to direct wash fluids onto at least on rack assembly for washing articles located therein. For the example embodiment of FIG. 2, dishwasher appliance 100 further includes a plurality of spray assemblies for urging a flow of water or wash fluid onto the articles placed within wash chamber 106. More specifically, as illustrated in FIG.

2, dishwasher appliance 100 includes a first spray assembly 134 (also referred to as a lower spray arm assembly 134) disposed in a lower region 136 of wash chamber 106 and above a sump 138 so as to rotate in relatively close proximity to lower rack assembly 122. Similarly, a second spray assembly 140 (also referred to as a mid-level spray arm assembly 140) is located in an upper region 137 of wash chamber 106 and may be located below and in close proximity to middle rack assembly 124. In this regard, mid-level spray arm assembly 140 may generally be configured for urging a flow of wash fluid up through middle rack assembly 124 and third rack assembly 126. Additionally, an upper or third spray assembly 142 (also referred to as an upper spray assembly 142) may be located above upper or third rack assembly 126 along the vertical direction V. In this manner, third spray assembly 142 may be configured for urging and/or cascading a flow of wash fluid downward over rack assemblies 122, 124, and 126.

The various spray assemblies and manifolds described herein may be part of a fluid distribution system or fluid circulation assembly 150 for circulating water and wash fluid in the tub 104. More specifically, fluid circulation assembly 150 includes a pump 152 for circulating water and wash fluid (e.g., detergent, water, and/or rinse aid) in the tub 104. Pump 152 may be located within sump 138 or within a machinery compartment located below sump 138 of tub 104, as generally recognized in the art. Fluid circulation assembly 150 may include one or more fluid conduits or circulation piping for directing water and/or wash fluid from pump 152 to the various spray assemblies and manifolds. For example, as illustrated in FIG. 2, a primary supply conduit 154 may extend from pump 152, along rear side 112 of tub 104 along the vertical direction V to supply wash fluid throughout wash chamber 106. In some examples, a secondary supply conduit (not shown) may supply additional wash fluid to one or more various spray assemblies and manifolds.

As illustrated, primary supply conduit 154 is used to supply wash fluid to mid-level spray arm assembly 140 while a secondary supply conduit 92 supplies wash fluid to upper spray assembly 142. Diverter assembly 156 can allow selection between spray assemblies 134 and 140, 142 being supplied with wash fluid. However, it should be appreciated that according to alternative embodiments, any other suitable plumbing configuration may be used to supply wash fluid throughout the various spray manifolds and assemblies described herein.

Each spray assembly 134, 140, 142 or other spray device may include an arrangement of discharge ports or orifices for directing wash fluid received from pump 152 onto dishes or other articles located in wash chamber 106. The arrangement of the discharge ports, also referred to as jets, apertures, or orifices, may provide a rotational force by virtue of wash fluid flowing through the discharge ports. Alternatively, spray assemblies 134, 140, 142 may be motor-driven, or may operate using any other suitable drive mechanism. Spray manifolds and assemblies may also be stationary. Movement of the spray arm assemblies 134 and 140 and the spray from fixed manifolds like spray assembly 142 provides coverage of dishes, silverware, and other dishwasher contents and articles 94 to be cleaned with a washing spray. Other configurations of spray assemblies may be used as well. For example, dishwasher appliance 100 may have additional spray assemblies for cleaning silverware, for scouring casserole dishes, for spraying pots and pans, for cleaning bottles, etc. One skilled in the art will appreciate that the embodiments discussed herein are used for the purpose of explanation only and are not limitations of the present subject matter.

In operation, pump 152 draws wash fluid in from sump 138 and pumps it to a diverter assembly 156, e.g., which is positioned within sump 138 of dishwasher appliance. Diverter assembly 156 may include a diverter disk (not shown) disposed within a diverter chamber (not shown) for selectively distributing the wash fluid to the spray assemblies 134, 140, 142 and/or other spray manifolds or devices. For example, the diverter disk may have a plurality of apertures that are configured to align with one or more outlet ports (not shown) at the top of diverter chamber (not shown). In this manner, the diverter disk may be selectively rotated to provide wash fluid to the desired spray device.

According to an example embodiment, diverter assembly 156 is configured for selectively distributing the flow of wash fluid from pump 152 to various fluid supply conduits, only some of which (e.g., 154) are illustrated in FIG. 2 for clarity. More specifically, diverter assembly 156 may include four outlet ports (not shown) for supplying wash fluid to a first conduit for rotating lower spray arm assembly 134 in the clockwise direction, a second conduit for rotating lower spray arm assembly 134 in the counterclockwise direction, a third conduit for spraying rack assembly 126 (shown in FIG. 2) as a silverware rack, and a fourth conduit for supplying only mid-level and/or upper spray assemblies 140, 142. Other configurations of diverter assembly 156 and/or other components (e.g., valves) may be used to allow various choices in the operation of the spray assemblies 134, 140, and 142 during a cleaning cycle.

The dishwasher appliance 100 is further equipped with a controller 160 (FIG. 2) to regulate operation of the dishwasher appliance 100. Controller 160 may include one or more memory devices and one or more microprocessors, such as general or special purpose microprocessors operable to execute programming instructions or micro-control code associated with a cleaning cycle. The memory may represent random access memory such as DRAM or read only memory such as ROM or FLASH. In one embodiment, the processor executes programming instructions stored in memory. The memory may be a separate component from the processor or may be included onboard within the processor. Alternatively, controller 160 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software.

The controller 160 may be positioned in a variety of locations throughout dishwasher appliance 100. In the illustrated embodiment, the controller 160 may be located within a control panel area 162 of door 116. In such an embodiment, input/output ("I/O") signals may be routed between the control system and various operational components of dishwasher appliance 100 along wiring harnesses that may be routed through the bottom of door 116. Typically, the controller 160 includes a user interface panel/controls 164 (FIG. 1) through which a user may select various operational features and modes and monitor progress of the dishwasher appliance 100. In one embodiment, the user interface 164 may represent a general purpose I/O ("GPIO") device or functional block. In one embodiment, the user interface 164 may include input components, such as one or more of a variety of electrical, mechanical, or electro-mechanical input devices including rotary dials, push buttons, and touch pads. The user interface 164 may include a display component, such as a digital or analog display device designed to provide operational feedback to a user. The user interface 164 may be in communication with the controller 160 via one or more signal lines or shared communication busses.

It should be appreciated that the invention is not limited to any particular style, model, or configuration of dishwasher appliance 100. The example embodiment depicted in FIGS. 1 and 2 is for illustrative purposes only. For example, different locations may be provided for user interface 164, different configurations, including providing one or more rack assemblies 122, 124, 126 and one or more spray assemblies 134, 140, 142, to dishwasher appliance 100 may be used, different configurations may be provided for rack assemblies 122, 124, 126, different spray assemblies 134, 140, 142 and spray manifold configurations may be used, and other differences may be applied while remaining within the scope of the present subject matter.

Figure 3:
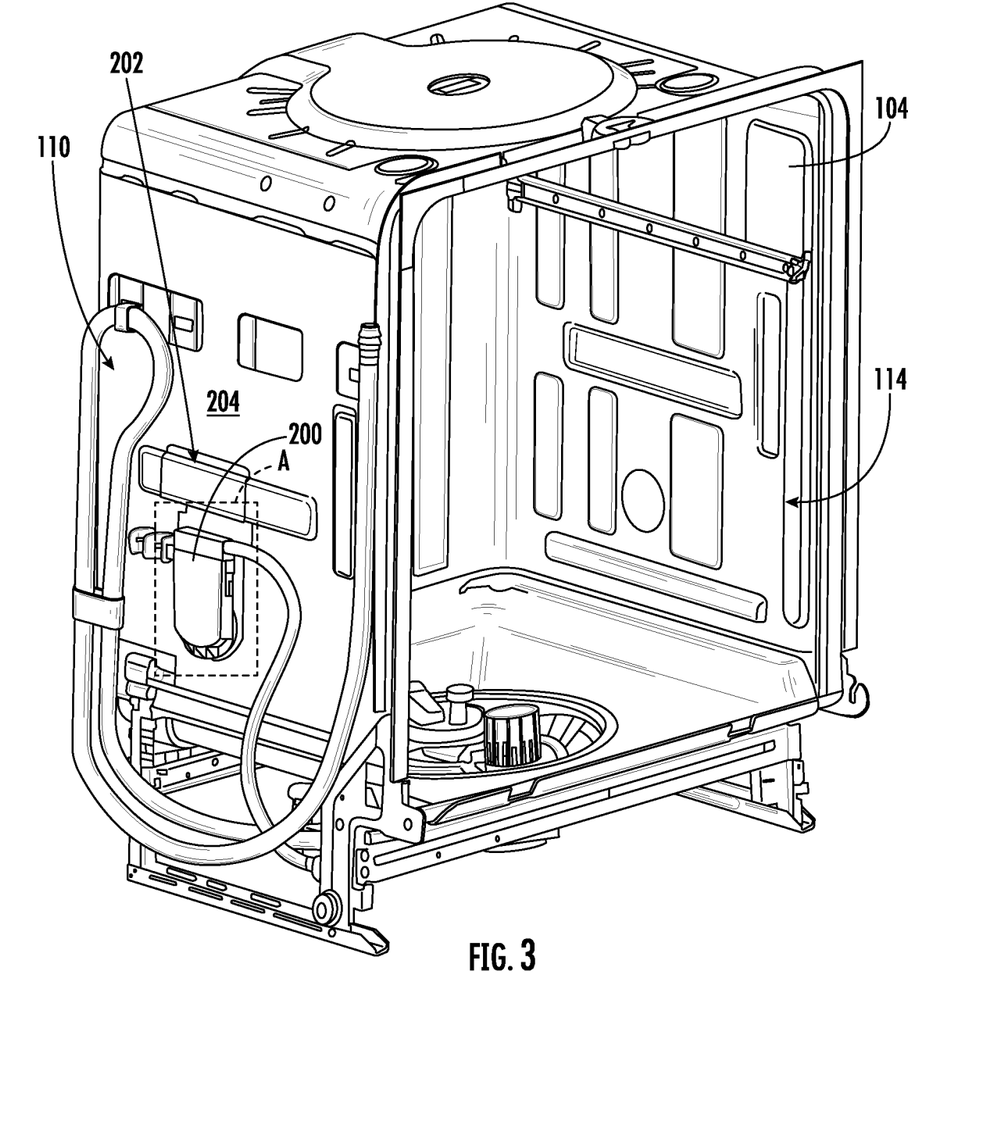
FIG. 3 provides a perspective view of a tub of an example embodiment of a dishwashing appliance according to aspects of the present disclosure.
Figure 4:
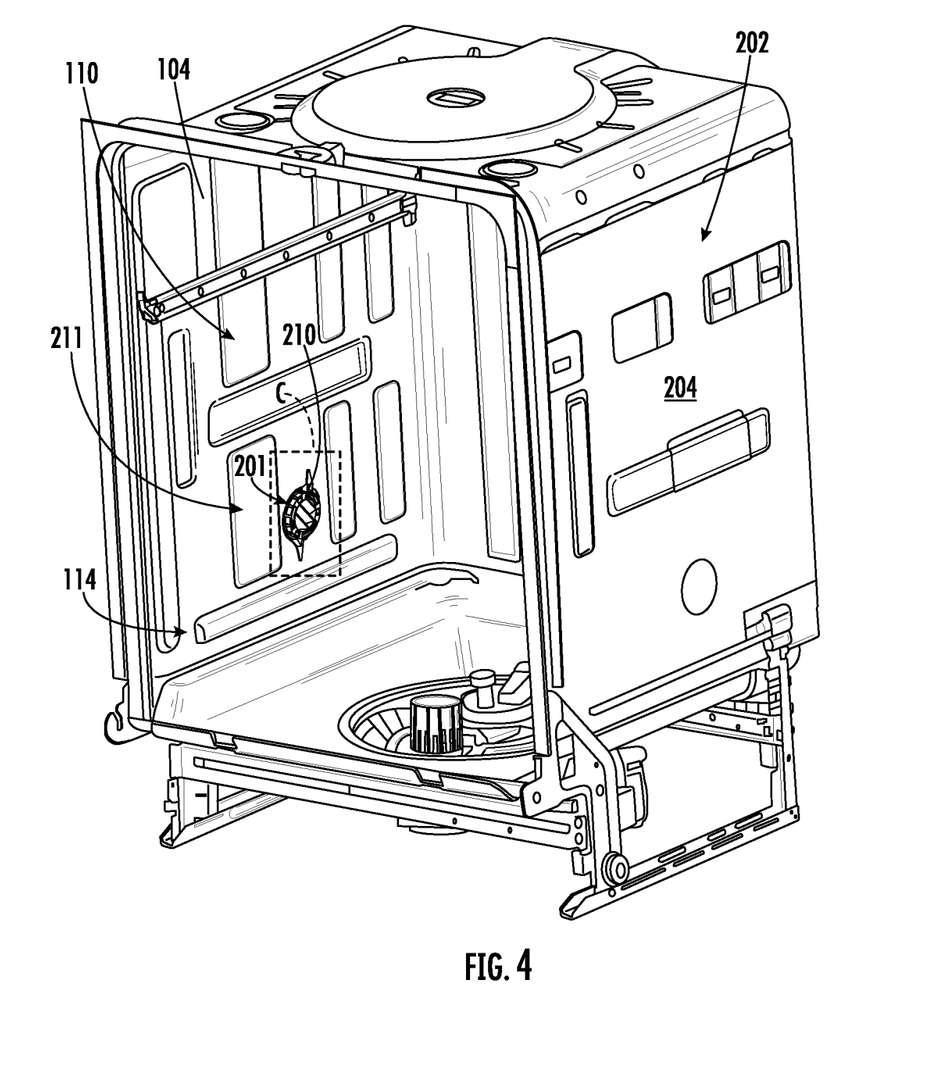
FIG. 4 provides a perspective view of an interior of the tub of FIG. 3 according to aspects of the present disclosure.

As may be generally seen in FIGS. 3-10, tub 104 may include a fill funnel 200 generally configured for supplying tub 104 with water for use in the wash and/or rinse cycles. As seen in FIG. 3, fill funnel 200 may be positioned at an exterior portion 202 of tub 104. Specifically, as seen in FIG. 4, fill funnel 200 may be positioned on one of the pair of opposing sidewalls 110 at a fill hole 201. Fill funnel 200 may be secured to tub 104 via locking nut 210 at an interior portion 211. Generally, solely relying upon locking nut 210 may only partly constrain fill funnel 200 relative to tub 104, e.g., thus allowing fill funnel 200 to freely rotate, which may cause fill funnel 200 to separate from tub 104.

Figure 5:
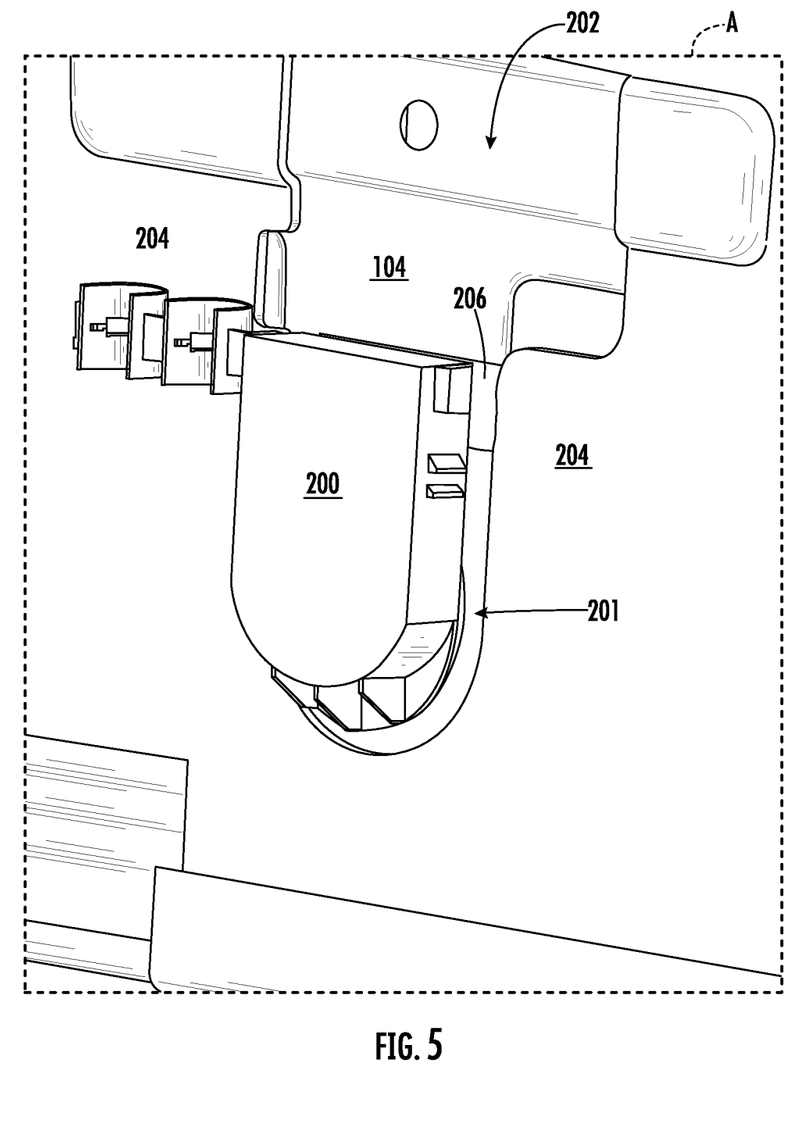
FIG. 5 provides a detailed view of a portion A of the tub of FIG. 3 according to aspects of the present disclosure.
Figure 6:
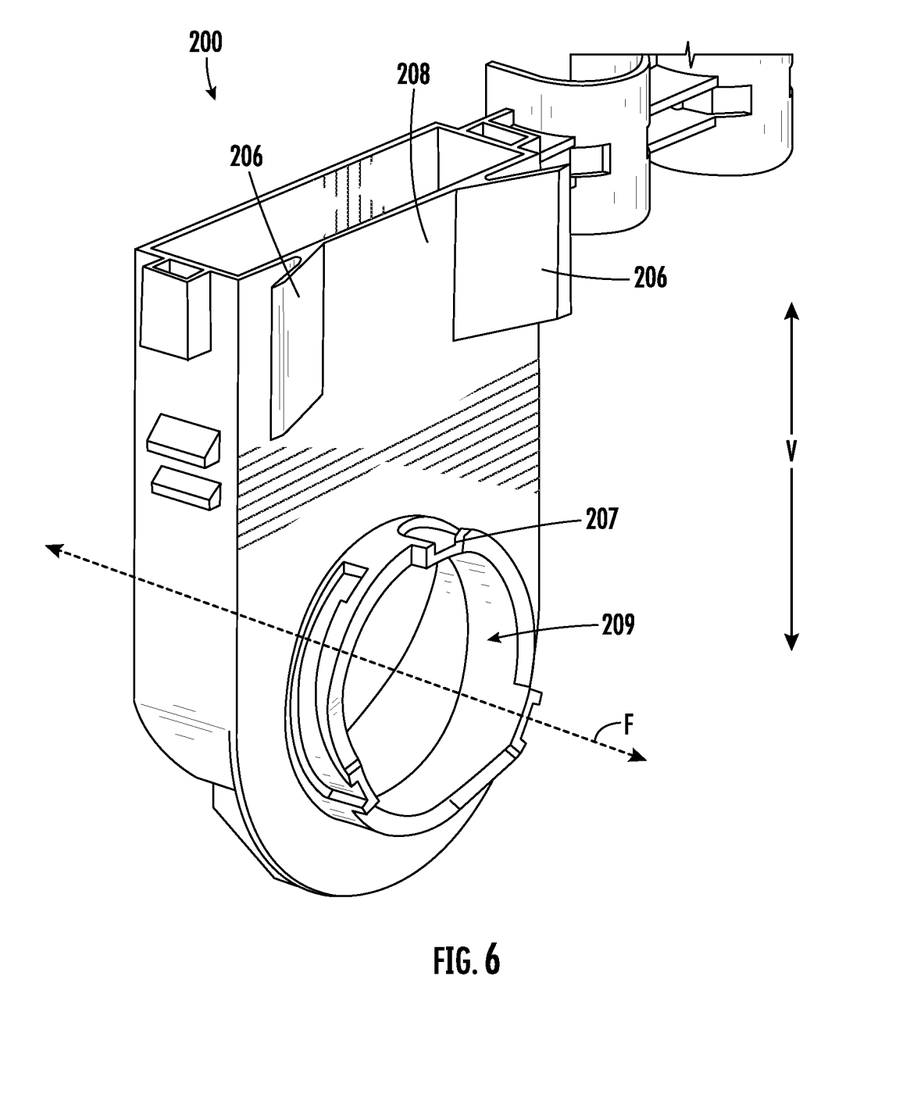
FIG. 6 provides a perspective view of a fill funnel according to aspects of the present disclosure.
Figure 7:
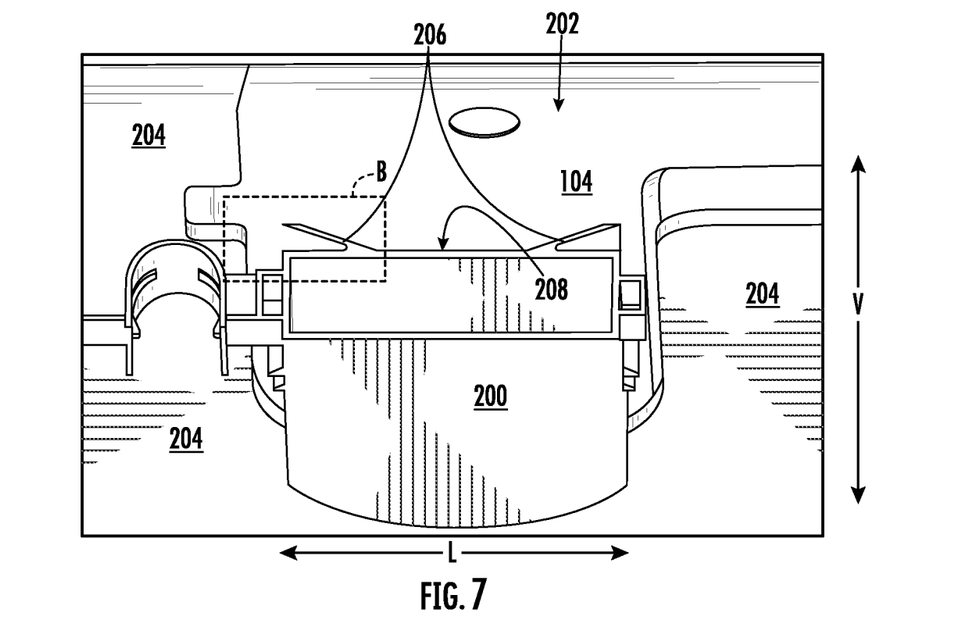
FIG. 7 provides a top, perspective view of the fill funnel of FIG. 6 at the tub of FIG. 3.
Figure 8:
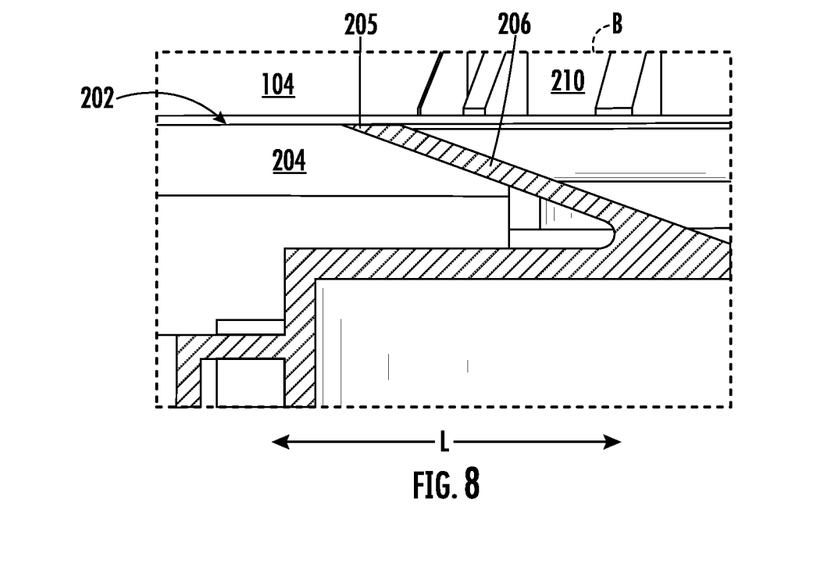
FIG. 8 provides a detailed view of a portion B of FIG. 7 according to aspects of the present disclosure.

As seen in FIGS. 5-8, fill funnel 200 may include at least two (2) fins, or tabs 206 generally configured to prevent rotation in either direction about the axis F of the fill funnel outlet 209 (FIG. 6). FIG. 5 illustrates a portion A of FIG. 3 in greater detail, in particular, fins 206 may be configured to engage with a mastic layer 204 on the exterior portion 202 of tub 104. Mastic layer 204, as would be understood by one of skill in the art, may be a sound deadening layer adhered or heat-treated onto tub 104. As seen in FIG. 6, fins 206 may extend from a mating face 208 of fill funnel 200 adjacent to tub 104. FIG. 7 illustrates mastic layer 204 formed on each side of fill funnel 200 with respect to the lateral direction L. Further, illustrated in FIG. 8 is a more detailed, top view portion B of FIG. 7, where a tip 205 of fin 206 is seen engaging in mastic layer 204. As stated above, the interference between fins 206 and mastic layer 204 may prevent rotation of fill funnel 200 about the axis F of the fill funnel outlet 209.

Figure 9:
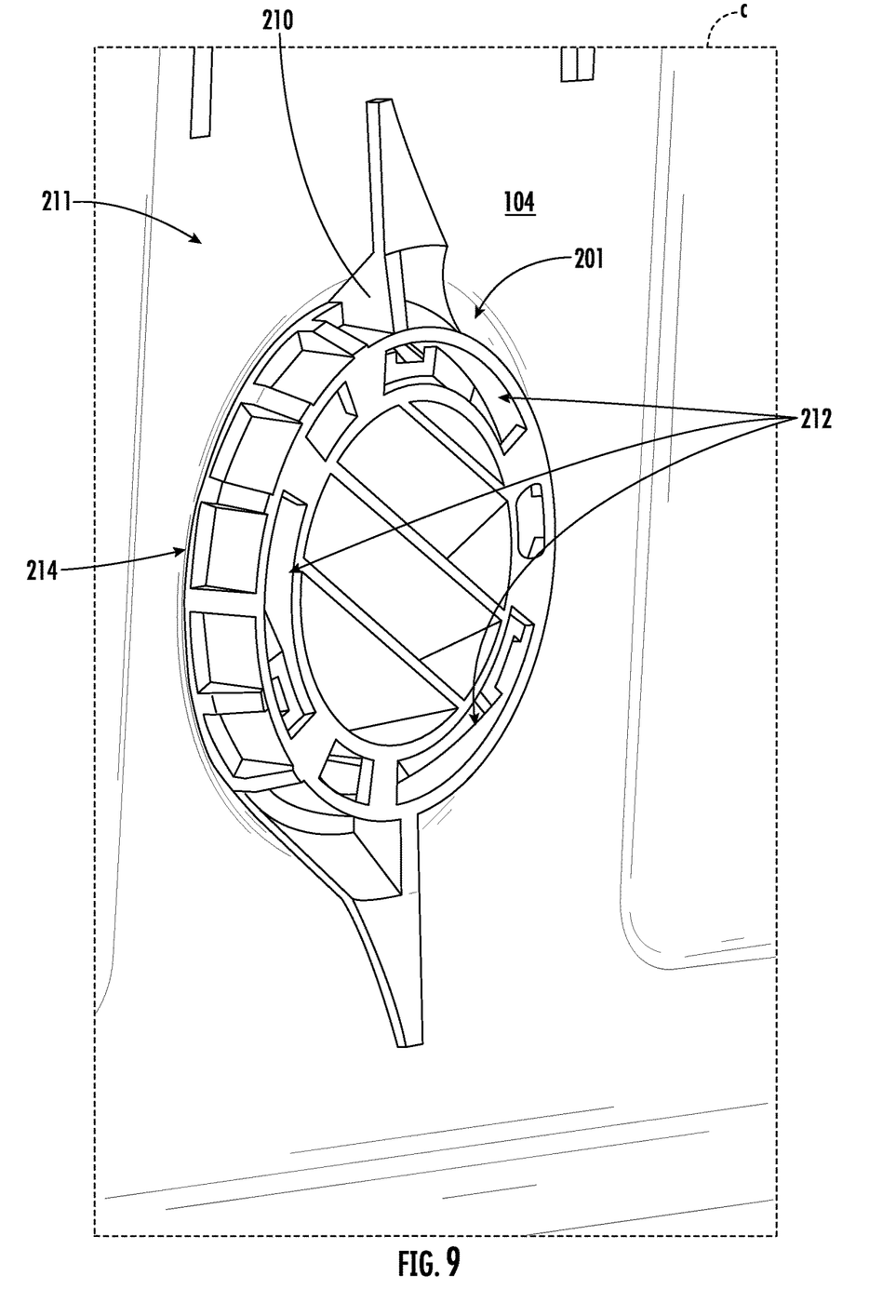
FIG. 9 provides a detailed view of a portion C of a locking nut of FIG. 4 according to aspects of the present disclosure.

In order to ensure that fill funnel 200 is properly secured to tub 104, locking nut 210 may compress mating face 208 against tub 104, e.g., fins 206 may be compressed between mating face 208 and tub 104 generating more friction interference, thus preventing rotation of fill funnel 200 about the axis F of the fill funnel outlet 209. As seen in FIG. 9, portion C of FIG. 4, locking nut 210 engages with fill funnel 200 at an interior portion 211 of tub 104. Locking nut 210 may also compress a gasket 214 between locking nut 210 and tub 104. Gasket 214 may be rubber or any other suitable material to compress and seal fill hole 201 from leaking water. In order to provide additional compressive force between mating face 208 and tub 104, locking nut 210 may include a plurality of cored-out portions 212 generally configured for receiving fill funnel outlet 209.

Figure 10:
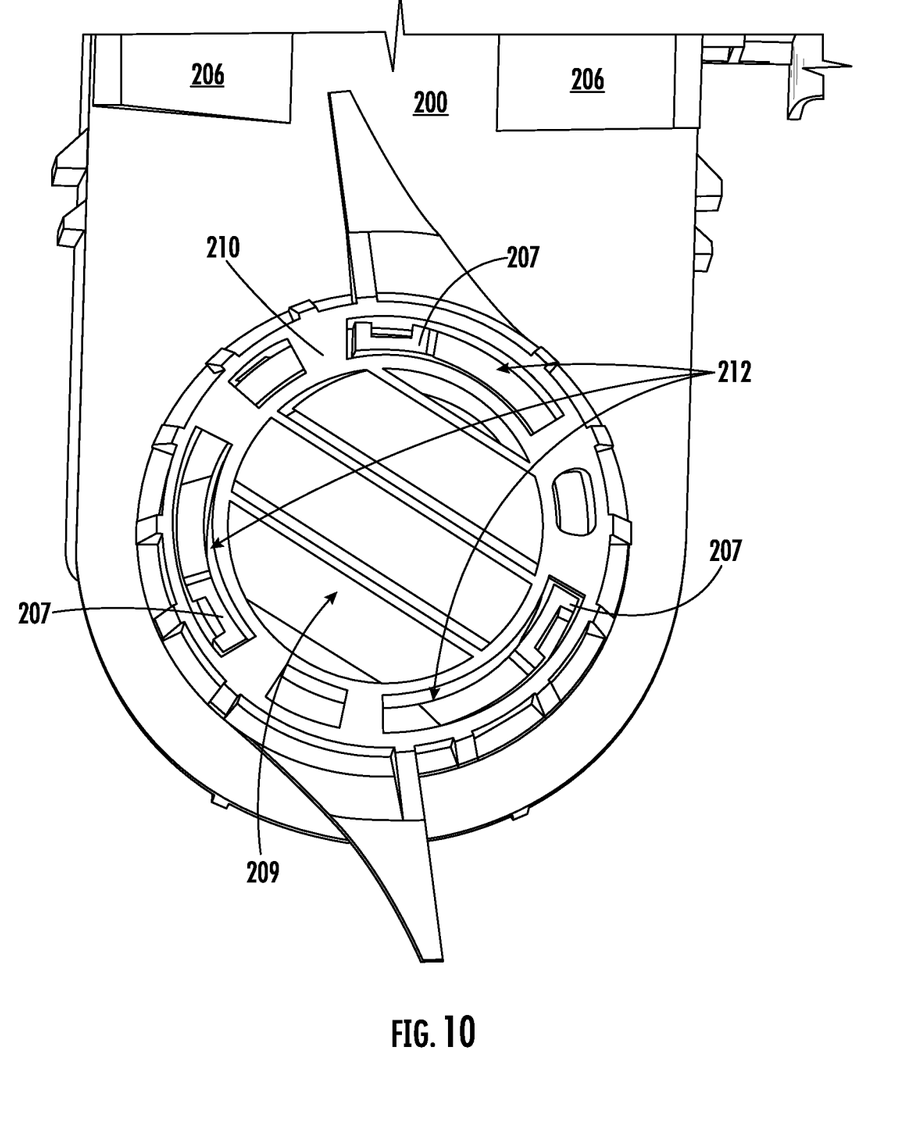
FIG. 10 provides a front, perspective view of the locking nut of FIG. 9.

As seen in FIG. 10, a plurality of extrusions 207 of fill funnel 200 may extend through the plurality of cored-out portions 212 when fully engaged. The full engagement of locking nut 210 onto fill funnel 200 where the plurality of extrusions 207 of fill funnel 200 extend through the plurality of cored-out portions 212 provides greater compressive force between mating face 208 and tub 104 than a traditional locking nut without cored portions. The plurality of extrusions 207 from fill funnel 200 may include two (2) or more extrusions extending through (2) or more cored-out portions of the plurality of cored-out portions 212. As shown in FIG. 10, the plurality of extrusions 207 includes three (3) extrusions, and the plurality of cored-portions includes three (3) cored-portions.

Figure 11:
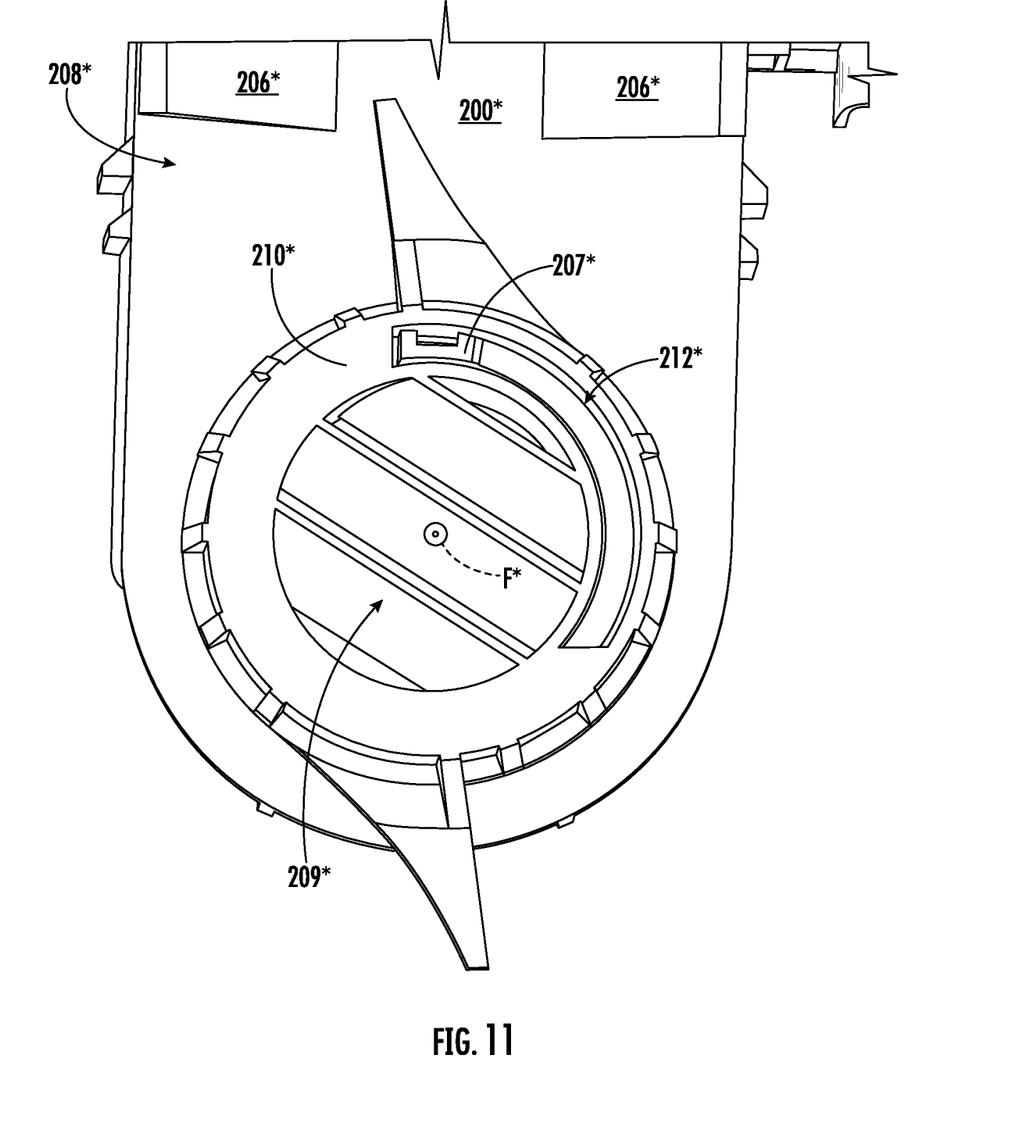
FIG. 11 provides a front, perspective view of an alternative embodiment of a locking nut according to aspects of the present disclosure.

Referring now to FIG. 11, another embodiment of a fill funnel 200* and locking nut 210* engagement is illustrated in accordance with aspects of the present disclosure. In general, the fill funnel 200* and locking nut 210* shown in FIG. 11 (and associated components, features, and/or structures) are configured similar to fill funnel 200 and locking nut 210 (and their associated components, features, and/or structures) described above with reference to FIGS. 1-10. As such, the components, features, and/or structures of the fill funnel 200* and locking nut 210* that are the same or similar to corresponding components, features, and/or structures of the fill funnel 200 and locking nut 210 described above will be designated by the same reference character with an asterisk (*) added. Additionally, when a given component, feature, and/or structure of the fill funnel 200* and locking nut 210* is configured to generally perform the same function as the corresponding component, feature, and/or structure of the fill funnel 200 and locking nut 210 described above, a less detailed description of such component/feature/structure will be provided below for the sake of brevity.

As shown in FIG. 11, similar to the embodiment described above, fill funnel 200* may include at least two (2) fins, or tabs 206* generally configured to prevent rotation in either direction about the axis F* of the fill funnel outlet 209*. Fins 206* may extend from a mating face 208* of fill funnel 200*, e.g., configured to be adjacent to tub 104. In order to ensure that fill funnel 200* is properly secured to tub 104, locking nut 210* may compress mating face 208* against tub 104, e.g., fins 206* may be compressed between mating face 208* and tub 104 generating more friction interference, thus preventing rotation of fill funnel 200* about the axis F* of the fill funnel outlet 209. In order to provide additional compressive force between mating face 208* and tub 104, locking nut 210* may include a cored-out portion 212* generally configured for receiving fill funnel outlet 209* of fill funnel 200*. An extrusion 207* of fill funnel 200* may extend through the cored-out portion 212* when fully engaged. The full engagement of locking nut 210* onto fill funnel 200* where extrusion 207* of fill funnel 200* extends through cored-out portion 212* provides greater compressive force between mating face 208* and tub 104 than a traditional locking nut without the cored portion.

As may be seen from the above, a fill funnel 200 of a dishwashing appliance 100 may include fins 206 on mating face 208 of fill funnel 200 generally configured to interfere with the mastic layer 204 of tub 104 when attempting to rotate. Further, locking nut 210, generally configured to secure fill funnel 200 to tub 104, may include cored-out portions which permit extrusions 207 of fill funnel 200 to pass through the locking nut without interference, thus permitting a tighter seal when locking nut 210 is fully rotated.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A dishwashing appliance, comprising:
    a tub defining a wash chamber for receipt of articles for washing, the tub comprising a fill hole in a side of the tub;
    a door mounted to the tub to selectively restrict access to the wash chamber of the tub;
    a mastic layer mounted on the tub around at least a portion of an exterior of the tub;
    a fill funnel positioned at the fill hole in the side of the tub, the fill funnel comprising a mating face positioned at the exterior of the tub, at least two fins extending from the mating face, and a fill funnel outlet extending through the fill hole at the side of the tub, the at least two fins engaging with the mastic layer at the exterior of the tub;
    a locking nut removably coupled to the fill funnel at the wash chamber of the tub, the locking nut comprising a plurality of cored-out portions configured to receive a plurality of extrusions of the fill funnel outlet passing through the locking nut; and
    a gasket positioned between the fill funnel and the locking nut.

2. The dishwashing appliance of claim 1, wherein a tip of each of the at least two fins of the fill funnel compresses into the mastic layer of the tub.

3. The dishwashing appliance of claim 1, wherein the at least two fins of the fill funnel engaging with the mastic layer of the tub obstructs rotation of the fill funnel about an axis of the fill funnel outlet.

4. The dishwashing appliance of claim 1, wherein the locking nut removably couples to the fill funnel in the wash chamber of the tub at the fill funnel outlet extending through the fill hole.

5. The dishwashing appliance of claim 1, wherein the locking nut threads to the fill funnel outlet in order to couple to the fill funnel.

6. The dishwashing appliance of claim 5, wherein the threading of the locking nut to the fill funnel outlet compresses the gasket between the fill funnel and the locking nut and seals the fill hole of the tub.

7. The dishwashing appliance of claim 5, wherein the threading of the locking nut to the fill funnel outlet compresses the at least two fins of the fill funnel with the exterior of the tub.

8. The dishwashing appliance of claim 5, wherein the threading of the locking nut to the fill funnel outlet generates a friction fit to obstruct rotation of the fill funnel about an axis of the fill funnel outlet.

9. The dishwashing appliance of claim 1, wherein the plurality of cored-out portions of the locking nut receives at least two extrusions of the plurality of extrusions of the fill funnel outlet passing through the locking nut.

10. The dishwashing appliance of claim 1, wherein the tub is stainless steel.

11. A dishwashing appliance, comprising:
    a tub defining a wash chamber for receipt of articles for washing, the tub comprising a fill hole in a side of the tub;
    a door mounted to the tub to selectively restrict access to the wash chamber of the tub;
    a mastic layer mounted on the tub around at least a portion of an exterior of the tub;
    a fill funnel positioned at the fill hole in the side of the tub, the fill funnel comprising a mating face positioned at the exterior of the tub, at least two fins extending from the mating face, and a fill funnel outlet extending through the fill hole at the side of the tub, the at least two fins engaging with the mastic layer at the exterior of the tub;
    a locking nut removably coupled to the fill funnel at the wash chamber of the tub, the locking nut comprising a cored-out portion configured to receive an extrusion of the fill funnel outlet passing through the locking nut; and
    a gasket positioned between the fill funnel and the locking nut.

12. The dishwashing appliance of claim 11, wherein a tip of each of the at least two fins of the fill funnel compresses into the mastic layer of the tub.

13. The dishwashing appliance of claim 11, wherein the at least two fins of the fill funnel engaging with the mastic layer of the tub obstructs rotation of the fill funnel about an axis of the fill funnel outlet.

14. The dishwashing appliance of claim 11, wherein the locking nut removably couples to the fill funnel in the wash chamber of the tub at the fill funnel outlet extending through the fill hole.

15. The dishwashing appliance of claim 11, wherein the locking nut threads to the fill funnel outlet in order to couple to the fill funnel.

16. The dishwashing appliance of claim 15, wherein the threading of the locking nut to the fill funnel outlet compresses the gasket between the fill funnel and the locking nut and seals the fill hole of the tub.

17. The dishwashing appliance of claim 15, wherein the threading of the locking nut to the fill funnel outlet compresses the at least two fins of the fill funnel with the exterior of the tub.

18. The dishwashing appliance of claim 15, wherein the threading of the locking nut to the fill funnel outlet generates a friction fit to obstruct rotation of the fill funnel about an axis of the fill funnel outlet.

19. The dishwashing appliance of claim 11, wherein the tub is stainless steel.

* * * * *